US010832076B2

(12) United States Patent
Danielsson et al.

(10) Patent No.: US 10,832,076 B2
(45) Date of Patent: Nov. 10, 2020

(54) METHOD AND IMAGE PROCESSING ENTITY FOR APPLYING A CONVOLUTIONAL NEURAL NETWORK TO AN IMAGE

(71) Applicant: Axis AB, Lund (SE)

(72) Inventors: Niclas Danielsson, Lund (SE); Simon Molin, Lund (SE); Markus Skans, Lund (SE)

(73) Assignee: AXIS AB, Lund (SE)

( * ) Notice: Subject to any disclaimer, the term of this patent is extended or adjusted under 35 U.S.C. 154(b) by 112 days.

(21) Appl. No.: 16/208,587

(22) Filed: Dec. 4, 2018

(65) Prior Publication Data

US 2019/0188512 A1 Jun. 20, 2019

(30) Foreign Application Priority Data

Dec. 14, 2017 (EP) ..................................... 17207325

(51) Int. Cl.
| | |
|---|---|
| G06K 9/32 | (2006.01) |
| G06K 9/48 | (2006.01) |
| G06T 7/00 | (2017.01) |
| G06K 9/62 | (2006.01) |
| G06T 7/44 | (2017.01) |
| G06N 3/08 | (2006.01) |
| G06N 3/04 | (2006.01) |
| G06K 9/46 | (2006.01) |

(52) U.S. Cl.
CPC .............. *G06K 9/3241* (2013.01); *G06K 9/32* (2013.01); *G06K 9/4628* (2013.01); *G06N 3/08* (2013.01); *G06T 7/44* (2017.01); *G06T 7/97* (2017.01)

(58) Field of Classification Search
None
See application file for complete search history.

(56) References Cited

U.S. PATENT DOCUMENTS

| | | | |
|---|---|---|---|
| 2014/0270488 A1* | 9/2014 | Suleyman | G06K 9/00362 382/157 |
| 2017/0083792 A1* | 3/2017 | Rodriguez-Serrano | G06T 7/10 |
| 2017/0083796 A1* | 3/2017 | Kim | G06K 9/00369 |
| 2018/0129893 A1* | 5/2018 | Son | G06K 9/6256 |
| 2019/0080456 A1* | 3/2019 | Song | G06T 7/12 |

OTHER PUBLICATIONS

Krizhevsky, A. et al., "ImageNet Classification with Deep Convolutional Neural Networks," Communications of the ACM, Association for Computing Machinery, Inc, United States, vol. 60, No. 6, May 24, 2017 (May 24, 2017), pp. 84-90, XP058339266, ISSN: 0001-0782, DOI: 10.1145/3065386.
Extended European Search Report for European Application No. 17207325.6, dated May 17, 2018.

\* cited by examiner

*Primary Examiner* — Mohammed Rachedine
(74) *Attorney, Agent, or Firm* — Xsensus LLP (57) ABSTRACT

A method and an image processing entity for applying a convolutional neural network to an image are disclosed. The image processing entity processes the image while using the convolutional kernel to render a feature map, whereby a second feature map size of the feature map is greater than a first feature map size of the feature maps with which the feature kernel was trained. Furthermore, the image processing entity repeatedly applies the feature kernel to the feature map in a stepwise manner, wherein the feature kernel was trained to identify the feature based on the feature maps of the first feature maps, wherein the feature kernel has the first feature map size.

6 Claims, 5 Drawing Sheets

METHOD AND IMAGE PROCESSING ENTITY FOR APPLYING A CONVOLUTIONAL NEURAL NETWORK TO AN IMAGE

CROSS-REFERENCE TO RELATED APPLICATION

This application claims priority to European Patent Application No. 17207325.6, filed on 14 Dec. 2017, the entire contents of which being incorporated herein by reference.

TECHNICAL FIELD

The embodiments herein relate to image processing by use of convolutional neural networks. In particular, a method and an image processing entity for applying a convolutional neural network to an image of a second image size are disclosed. A corresponding computer program and a computer program carrier are also disclosed.

BACKGROUND

Within the field of image processing, a particular genre relates to object detection by means convolutional neural networks. The use of convolutional neural networks has become increasingly popular e.g. due to their computational efficiency.

A known convolutional neural network, configured to identify an object, such as a car, a cat, a human or the like, in an image, takes the image as input and provides a score e.g. as a probability that the object is present in the image.

In a so called convolutional action, performed in order to analyse the image, a filter kernel is applied in a sliding-window fashion over the entire image. Accordingly, the filter kernel is applied and moved along rows columns until the entire image has been analysed. An amount of pixels that the filter kernel is moved is often referred to as a stride. A stride of one pixel is used in many situations. The filter kernel assumes in this way a number of positions by which the entire image is covered. At each position, the filter kernel is convoluted with a respective portion of the entire image. The respective portion has the same size as the filter kernel, e.g. 3×3 pixels, 5×5 pixels, etc. The respective portion is often referred to as a receptive field of the filter kernel. The convolution result is a single scalar value that is usually passed through a non-linear function, for each position. Once the convolutions are completed, a so-called feature map, comprising the values for all positions, is obtained.

The convolutional neural network can be configured with one or more convolutional actions, each action resulting in a respective feature map that is used as input to subsequent actions.

The convolutional neural network can also be configured with one or more pooling actions, wherein each pooling action results in that a dimension of an input feature map is reduced. Similarly to the filter kernel, a so called pooling kernel is applied in a sliding-window fashion over the input feature map. Also in this case, the term "stride" can be used to describe how the pooling kernel is moved across the image to cover its entirety.

Subsequently, a so called fully connected layer is obtained by applying to e.g. the last feature map, a respective filter for each object type to be recognized and/or classified in case the network is trained as a classifier. The fully connected layer is a vector in which each index corresponds to a respective object type and the respective score of each index represents a probability. Hence, there will be a respective score for each object type as a respective result of applying a respective filter for each object type. With the convolutional neural network, a size of the respective filter is equal to the last feature map as indicated by the wording "fully connected". Furthermore, the score thus indicate probability that the object of a corresponding object type is present in the image. To conclude, in case only one object type is to be detected, the result layer comprises a single scalar value. In case many objects are to be detected, there may of course be one scalar value for each object type to be detected. That is, the fully connected layer is a vector. In some case, there may be further, earlier fully connected layers. The description above applies how to obtain fully connected layers from a final, or last, feature map as mentioned above.

When using convolutional neural networks for object detection, the convolutional neural network needs to be trained with images of a certain size. The convolutional neural network can then be applied to images of that certain size. This is problematic, since technology evolves quickly and cameras with higher and higher image resolution constantly appear on the market.

In an article, referred to herein as "overfeat-article", to P. Sermanet et al, "OverFeat: Integrated Recognition, Localization and Detection using Convolutional Networks", dated 24 Feb. 2014, a proposal for how to handle images of different sizes is disclosed. The article describes an integrated framework for using convolutional neural networks for classification, localization and detection. According to this article, an image, having a size greater than that of training images used during training, is analysed. Accordingly, a last feature map is greater than a fully connected layer, being obtained from training with the training images. Therefore, the fully connected layer is applied at every possible offset and resulting outputs are interleaved.

A problem related to the above mentioned convolutional neural network is that it is very computationally demanding to apply the fully connected layer at every possible offset.

SUMMARY

An object may be to improve efficiency, e.g. reduce computing needs, of feature detection using convolutional neural networks of the above mentioned kind.

According to an aspect, the object is achieved by a method for applying a convolutional neural network to an image. The convolutional neural network comprises a convolutional kernel for convolving with images of a first image size to render feature maps and a feature kernel, e.g. used to obtain a so-called fully connected layer, trained to identify a feature in the images based on the feature maps. The first image size is less than a second image size of the image to which the convolutional neural network is applied. The image is processed while using the convolutional kernel to render a feature map, whereby a second feature map size of the feature map is greater than a first feature map size of the feature maps with which the feature kernel was trained.

Furthermore, the feature kernel is repeatedly applied to the feature map in a stepwise manner. The feature kernel was trained to identify the feature based on the feature maps of the first feature map size. Accordingly, the feature kernel has the first feature map size as well. The feature maps were obtained by convolving the convolutional kernel over images having the first image size, which causes, at least due to the convolution, the feature map to have the second feature map size. The stepwise manner is represented by a step size that is greater than half of the first feature map size.

According to another aspect, the object is achieved by an image processing entity configured for performing the method above.

According to further aspects, the object is achieved by a computer program and a computer program carrier corresponding to the aspects above.

Since the step size is greater than half of the first feature map size, a reduction of calculations needed to cover the entire feature map is achieved as compared to the calculations needed when using a step size of one as proposed in the overfeat-article. Generally, the step size may be above one and essentially up to the width of the feature kernel, i.e. the first feature map size. When using a step size that is greater than the first feature map size there may be some loss of information, making it less desirable, although possible. Consequently, it is believed that when the step size is increased above one, the embodiments herein may be used. However, gain due to the reduction of calculations may be more prominent when the step size is greater than half of the first feature map size. In some examples, it may be preferred that the step size is less than twice the first feature map size, or approximately twice the first feature map size, since it is expected that the loss of information at greater step sizes may not be compensated for with the embodiment herein. Effects of the present invention are thus extra beneficial for embodiments where large, in terms of pixels, input images are used. In this way the present invention enables continued use of already trained networks when input images grow larger and larger due to the continuous development of image sensors.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar actions, modules, circuits, parts, items, elements, units or the like, when applicable. In the present specification "feature detection" refers to identification, classification, or detection of objects.

Figure 1:
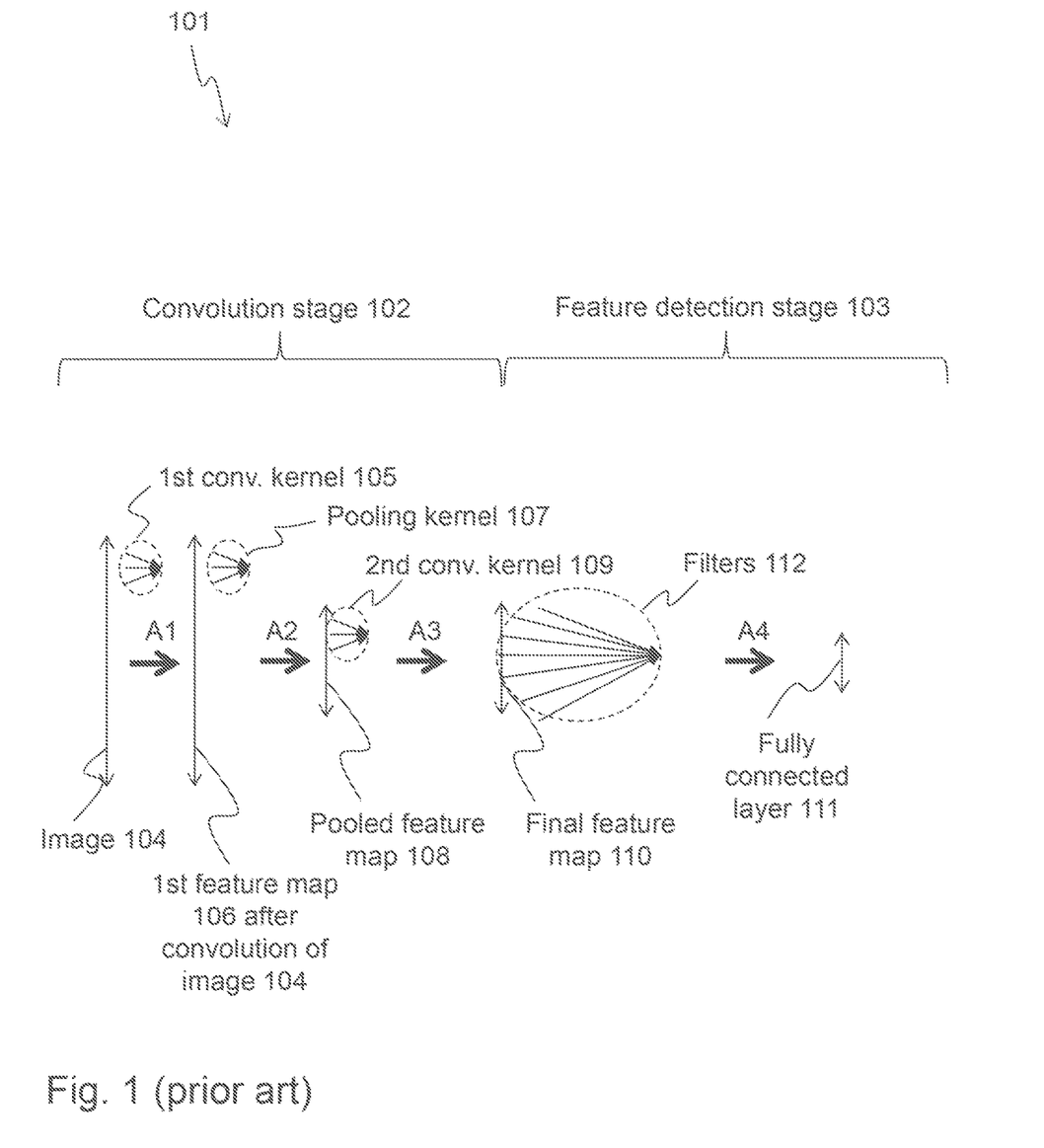
FIG. 1 is a schematic overview of a known convolutional neural network for detection of a feature in an image.

In order to better appreciate the advantages of the embodiments herein, a brief description of a known convolutional neural network for feature detection in an image is provided with reference to FIG. 1. In FIG. 1 the feature detection stage refers to identification, classification or detection of features.

In this context, "features" could correspond to cats, cars or any other object or parts of an object that may be shown in the image.

FIG. 1 shows a neural network 101 comprising a convolution stage 102 and a feature detection stage 103, which sometimes may be referred to as a fully connected stage.

The convolution stage 102 convolves, in action A1, an image 104 by sliding a first convolutional kernel 105 over the image 104 to obtain a first feature map 106. The image 104, sometimes referred to as "input image", is illustrated as seen from one side, but the image may typically have a height and a width. Furthermore, the image includes a number of pixels, wherein each pixel corresponds to position in the image 104. Each pixel may further be represented by a depth for colour components as is known in the art. For example, the pixel may have a depth of three to represent the colours, red, green and blue. Similarly, the first convolutional kernel 105 may typically have a width and a height, but may also include a depth. The image 104 is padded with zeros such that the $1^{st}$ feature map 106 obtains the same size as the image 104.

The sliding of the first convolutional kernel 105 is performed by moving the first convolutional kernel 105 along rows and columns of the image 104 until the entire image 104 has been covered. An amount that the first convolutional kernel 105 is moved is herein referred to as a stride size, which may for example be expressed as a number of pixels. The stride size may be the same or different of movements along rows and columns. As used herein, the term "stride" may refer to displacement of consecutive applications of a convolutional kernel to an original image, or an intermediate feature map.

Next, in action A2 of the convolution stage 102, a pooling of the $1^{st}$ feature map 106 is performed by sliding, or moving, a pooling kernel 107 over the $1^{st}$ feature map 106 to obtain a pooled feature map 108. As above, the pooling kernel 107 is moved over the first feature map 106 until its entirety is covered. Again, the pooled feature map 108 and/or the polling kernel 107 may have a width and a height and possibly also a depth. In this manner, averaging, maximum selection of activations in the $1^{st}$ feature map 106 may be obtained according to known manners.

Furthermore, in action A3 of the convolution stage 102, the pooled feature map 108 is convolved by sliding a second convolutional kernel 109 of the pooled feature map 108. The pooled feature map 108 is padded with zeros according to known manners. Thus, a final feature map 110 is obtained. Again, the final feature map 110 and/or the second convolutional kernel 109 may have a width and a height and possibly also a depth. A value of the final feature map 110 may contain information from a particular area of the image 104. Sometimes, the value is referred to as an activation, node, point or the like.

In the feature detection stage 103, a fully connected layer 111 is obtained by applying filters 112 connecting to all nodes in the final feature map 110. This is illustrated by action A4. Each activation of the fully connected layer 111 may indicate a probability that the feature to be detected was present in the image 104. In case the convolutional neural network is trained to detect only one feature the fully connected layer may be a scalar value, and in case the convolutional neural network is trained to detect a number of features, the fully connected layer may have a dimension that corresponds to the number of features to be detected. As mentioned previously, the filters 112 may have a width and a height and possibly also a depth such as to match size of the final feature map. The observations above relating to the term "size" apply throughout the present disclosure.

It shall be understood that the description above is simplified in order not to obscure the description of the embodiments herein unnecessarily.

Figure 2:
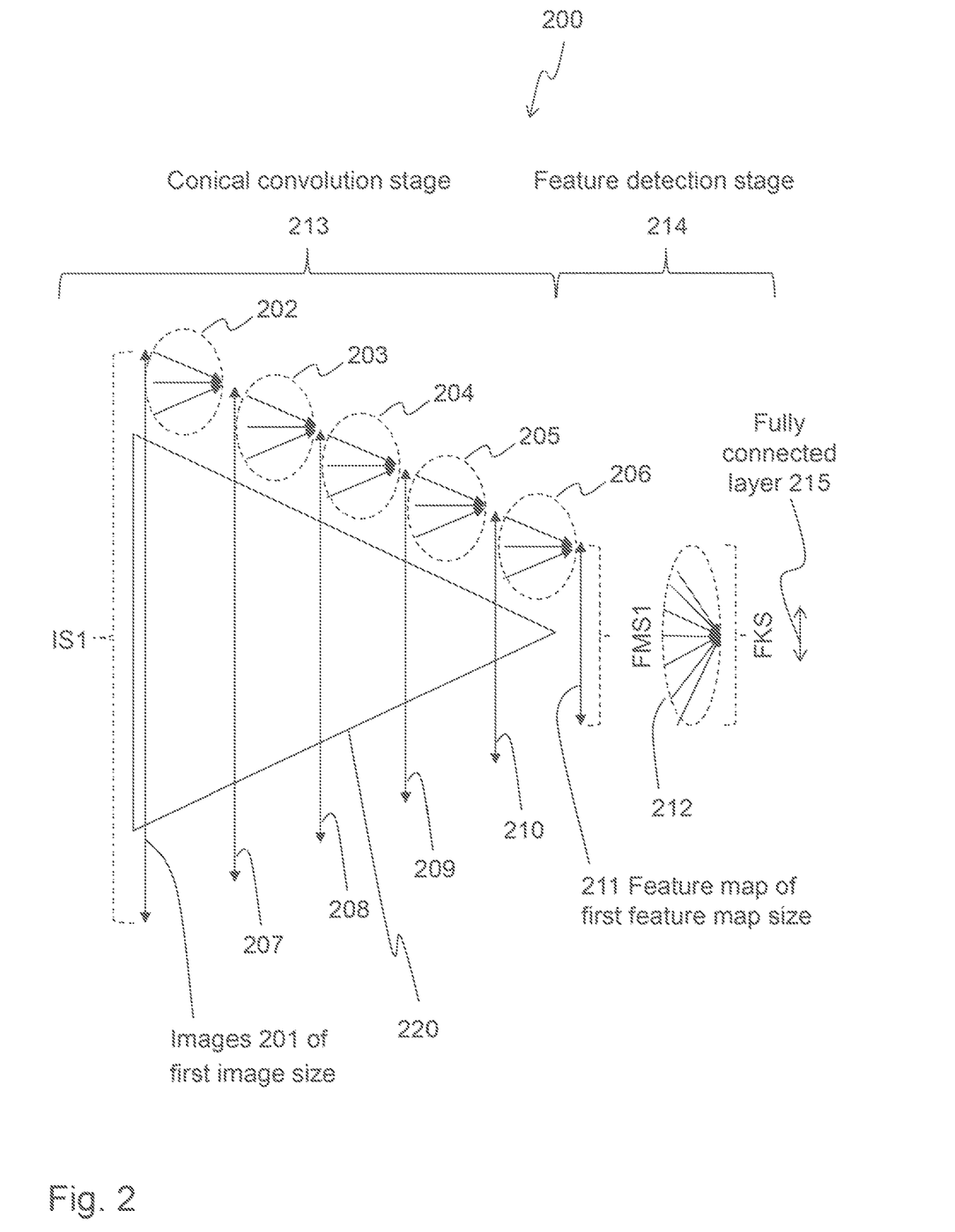
FIG. 2 is a schematic overview of an exemplifying convolutional neural network for detection of a feature in an image according to some embodiments herein.
Figure 3:
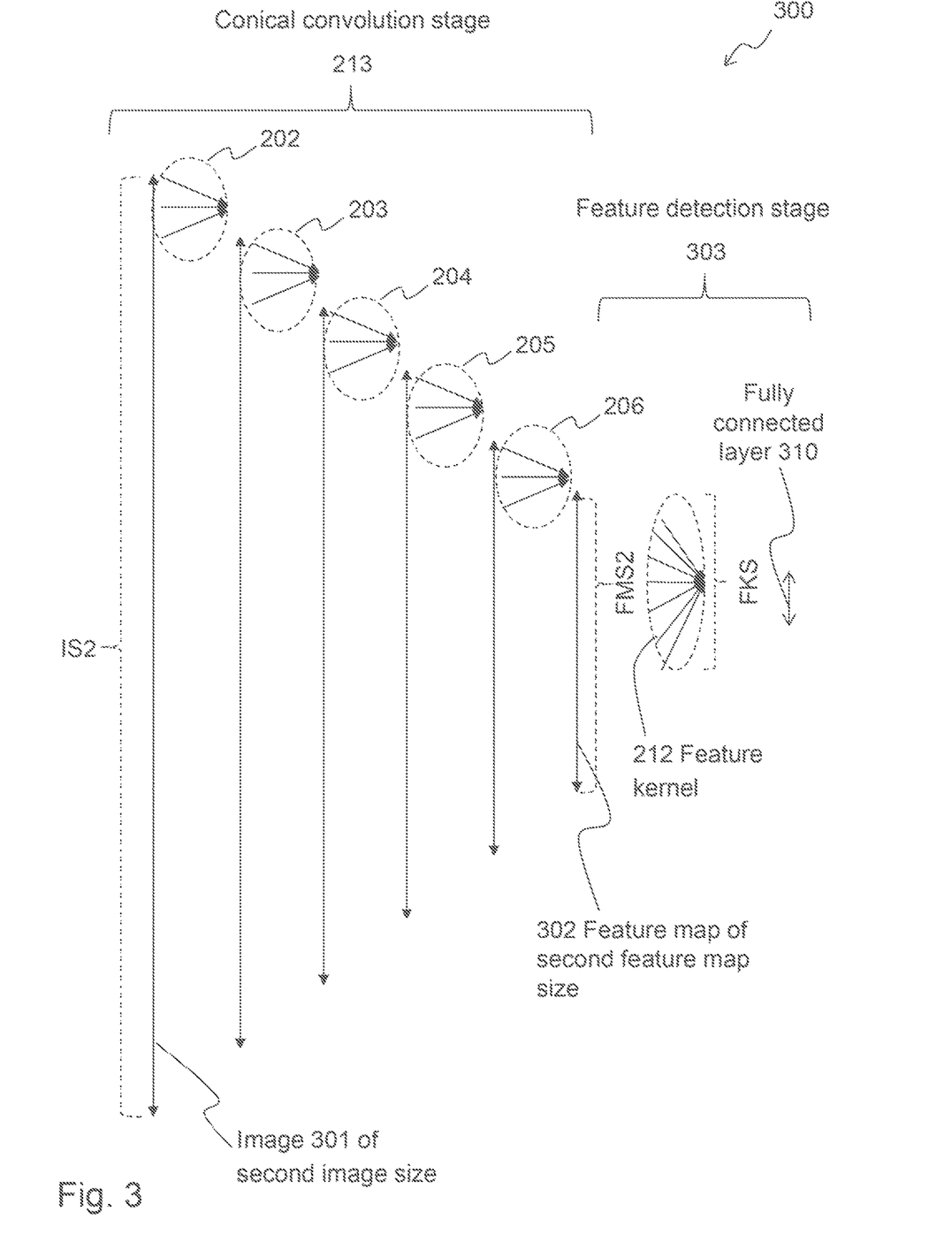
FIG. 3 is a schematic overview of when the exemplifying convolutional neural network of FIG. 2 is applied to larger images than it was trained with, FIG. 4 is a block diagram illustrating an embodiment of the image processing entity.

Before proceeding with a description of an exemplifying method according to the embodiments herein, FIG. 2 and FIG. 3 are described. FIG. 2 illustrates training of an exemplifying conical convolutional neural network 200 to be used with some embodiments herein and FIG. 3 illustrates application of the exemplifying conical convolutional neural network 200 of FIG. 2 according to the embodiments herein.

Hence, with reference to FIG. 2, there is illustrated how the exemplifying conical convolutional neural network 200 is trained with images 201 of a first image size IS1. The term "image" is used herein to refer to an entire image. Notably, this example may preferably be applied for training of position 9 in FIG. 6 below. For the other positions, illustrated in FIG. 6, image borders would cause truncation at one or more sides of a cone 220, where sides of the cone 220 correspond to the image's borders.

In this example, there are five convolutional actions in which respective convolutional kernels 202, 203, 204, 205, 206 are slid over the image 201 and/or respective feature maps 207, 208, 209, 210, as applicable. Thus, each convolutional action renders its respective feature map 207-211, where the respective feature map denoted 211 may be referred to as a final feature map. The term "convolutional kernel" refers to a kernel, a filter a convolutional filter or the like. A size of the respective convolutional kernels 202-206 may be 1×1, 2×2, 3×3, 4×4, 5×5, etc. depending on use case. The respective convolution kernels 202-206 may also have a depth that is equal to the number of colours/filter channels in the preceding layer.

In this example, the first image size IS1 of the images 201 and sizes of the respective convolutional kernels 202, 203, 204, 205 are matched such that the five convolutional actions results in the final feature map 211, which has a first feature map size FMS1 that is equal to a feature kernel size FKS of a feature kernel 212, which may be used to obtain an activation of a so-called fully connected layer 215. This means that there may be further feature kernels (not shown), i.e. preferably a unique filter kernel for each activation in the fully connected layer 215.

As used herein, the term "size" when used in connection with the term "image", "feature map", "feature kernel" or the like, typically refers to a size in terms of pixels, in x/y-direction and sometimes also colour depth. The expression "size greater than" may mean that at least one the aforementioned directions/depth is greater than its corresponding direction/depth in the image, kernel, map etc. with which it is compared.

Moreover, the exemplifying conical convolutional neural network 200 comprises a further conical convolution stage 213 and a further feature detection stage 214, where the word "further" distinguishes these stages from the stages mentioned with reference to FIG. 1.

In the further conical convolution stage 213, the exemplifying conical convolutional neural network 200 may typically not include zero-padding. The zero-padding may be left out thanks to a conical form used during training, as illustrated in FIG. 2, of the exemplifying conical convolutional neural network 200. Notably, there is zero-padding for the border segments in FIG. 6 as briefly touched upon above. Further details will be explained in relation to FIG. 6.

Zero-padding is normally used in order to allow convolutional kernels to be applied at edge pixels, or near edge pixels. Thanks to that the further convolutional stage 213 is free from zero-padding, or at least partially free from zero-padding, it may be ensured that the respective feature maps 207, 208, 209, 210, 211, or at least some of them, only includes information originating from actual image data, i.e. the respective feature maps 207, 208, 209, 210, 211, or at least some of them, does hence not include diluted information partly originating from zeros that the images 201 have been padded with. As a consequence, the final feature map 211 only includes information that originates from actual image data.

Figure 6:
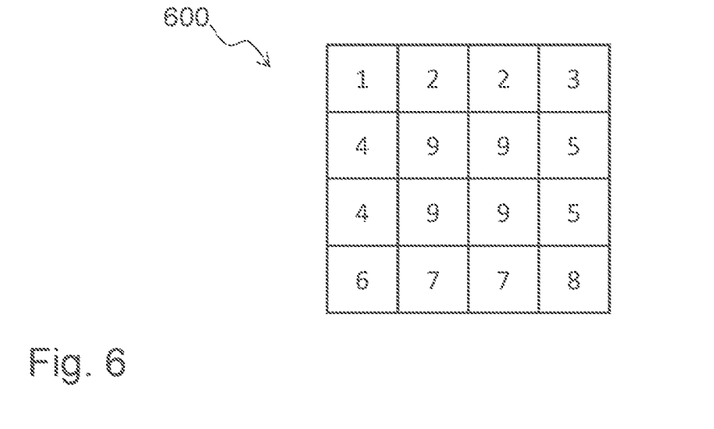
FIG. 6 is a block diagram illustrating different positions of a feature kernel within a feature map.

The exemplifying conical convolutional neural network 200 may, or may not, include pooling. Pooling is known in the art and is not illustrated here for reasons of simplicity. It may nevertheless be noted that pooling may preferably follow the same scheme as illustrated in FIG. 6 for the convolutions. For example, the pooling may preferably use partial zero-padding for the border positions.

Generally, architecture of neural networks is herein defined by sizes of involved matrices, such as images, feature maps, convolutional kernels, feature kernel(s), or the like, as well as how these matrices are combined, e.g. convolved, with each other. As an example, convoluting convolutional kernels to cover the image is performed while using a certain stride. Hence, the certain stride, i.e. a size of the certain stride, makes a building block to define the architecture of the neural networks.

Now turning to FIG. 3, application of an exemplifying conical convolutional neural network 200 of FIG. 2 is illustrated. Accordingly, an image 301 is feed into the further conical convolution stage 213 of the exemplifying conical convolutional neural network 200. The image 301 has a second image size IS2 that is greater than the first image size IS1 of the images 201 that the exemplifying conical convolutional neural network 200 was trained with according to FIG. 2.

In FIG. 3, the further conical convolution stage 213 remains the same as described in FIG. 2. The further feature detection stage 214 of FIG. 2 is, however, adapted in order to compensate for that the image 301, having the second image size IS2 that is greater than the first image size IS1, is fed into the further conical convolution stage 213. Therefore, FIG. 3 illustrates a further conical convolutional neural network 300, having the same further convolutional stage 213 and a yet further feature detection stage 303, which is based on the further feature detection stage 214. Accordingly, the yet further feature detection stage 303 includes adaptions that compensates for the second image size IS2 as will be explained below, e.g. with reference to FIG. 5. It shall already be mentioned that the yet further feature detection stage 303 reuses the feature kernel 212 without changes thereto. This is greatly advantageous since training is a time consuming and cumbersome task. Notably, a fully connected layer 310 is obtained, in which there will be one score of each position at which the feature kernel 212 has been applied to the feature map 302. These scores may thus be associated with one and the same object type or the like. Further feature kernels (not shown) may be applied to obtain scores for any further object types or the like when applicable.

When the further conical convolution stage 213 is fed with the image 301, a mathematical consequence thereof is that a further final feature map 302 having a second feature map size FMS2, being greater than the first feature map size FMS1, is obtained.

This means that the feature kernel 212 fits within the further final feature map 302. When applying the feature kernel 212 to the further final feature map 302 once, there will be portions of the further final feature map 302 that have not been analysed. A complete analysis of the further final feature map 302 is described with reference to FIG. 5 below, which thus also describe features of the yet further feature detection stage 303, i.e. how to adapt the further feature detection stage 214.

Thanks to the further conical convolutional neural network 300, it is made possible to "see further away" in the image 301 of the second image size IS2 due to its higher resolution, while the feature kernel 212 has been trained with the images 201 of the first image size IS1. This means that the further conical convolutional neural network 300 may detect features of the same minimum pixel size as the conical convolutional neural network 200. However, on a higher resolution image, such as the image 301, with the same field-of-view as the images 201, this will amount to seeing features further away, e.g. from an observer, camera or the like.

Figure 4:
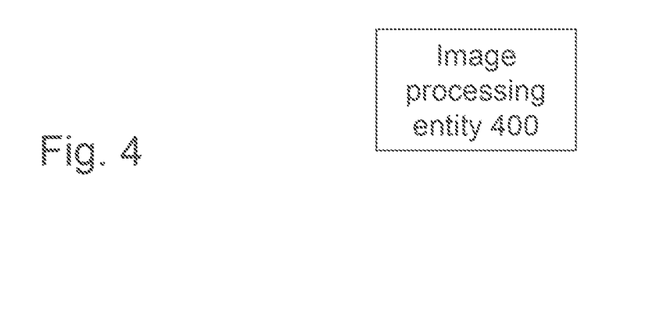

FIG. 4 illustrates a block diagram of an image processing entity 400 configured to perform exemplifying methods according to embodiments herein. The image processing entity 400, such as a digital camera, a surveillance camera, a mobile device including an image sensor, a computer, a software application executing in a computer system or the like, is described in more detail with reference to FIG. 7 below.

Figure 5:
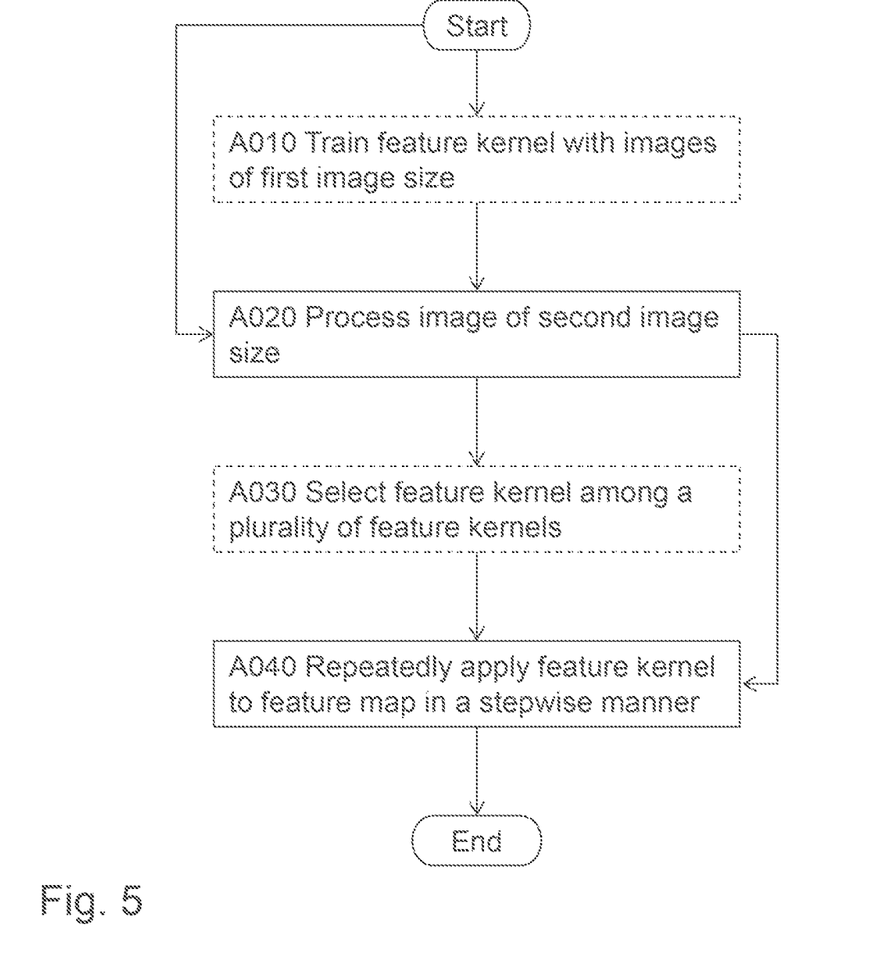
FIG. 5 is a flowchart illustrating embodiments of the method herein.

In FIG. 5, a schematic flowchart of the exemplifying methods in the image processing entity 400 is shown. In this Figure, actions that appear in some embodiments are indicated by dashed lines. Accordingly, the image processing entity 400 performs a method for applying a convolutional neural network, such as the exemplifying convolutional neural network 300 of FIG. 3, to an image, such as the image 301.

The convolutional neural network comprises a convolutional kernel, such as one or more of the convolutional kernels 202-206, for convolving with images, such as the images 201, of the first image size IS1 to render feature maps, such as respective final feature maps 211 for each of the images 201 or other non-final feature maps.

Furthermore, the convolutional neural network comprises the feature kernel 212 trained to identify a feature, or at least one feature, in the images 201 based on the feature maps. In more detail, the convolutional neural network may comprise one or more further feature kernels (not shown) in order to identify one or more further respective features, e.g. one for each feature kernel.

As mentioned, the first image size IS1 is less than the second image size IM2 of the image 301 to which the convolutional neural network is applied.

One or more of the following actions may be performed in any suitable order.

Action A010

Before applying the convolutional neural network to the image 301, the convolutional neural network may be trained as follows.

Thus, the image processing entity 400, or any other computing device, may train the exemplifying conical convolutional neural network 200 of FIG. 2 with images of the first image size IS1. In more detail, the image processing entity 400, or said any other computing device, may train the feature kernel based of feature maps obtained from the images of the first image size IS1.

Action A020

In order to detect the feature in the image 301, the image processing entity 400 processes the image 301 while using the convolutional kernel to render the feature map 302. As a result, the second feature map size FMS2 of the feature map 302 is greater than the first feature map size FMS1 of the feature maps 211 with which the feature kernel 212 was trained.

The feature map 302 may typically be obtained by convolving the convolutional kernel 202-206 over the image 301 having the second image size IS2 without zero-padding.

Furthermore, the feature map 302 may typically be rendered as a final feature map by means of the convolutional kernels 202-206.

Action A030

The image processing entity 400 may select, e.g. before performing action A040, a particular feature kernel among a plurality of feature kernels based on a position of the feature kernel relatively the feature map, i.e. the position within the feature map 302 at which the particular feature kernel to be selected shall be applied.

There may be nine different positions according to the following.

Firstly, the position may be one of four different corner positions, where the corner may be considered in two or three dimensions. The corner positions will occur due to that the feature map is greater than the feature kernel.

Secondly, when the second image is two times size of the images with which the conical convolutional neural network was trained in any direction, at least two edge positions may be identified. Normally, there are four edge positions when the second image is two times size of the images in two directions.

Thirdly, when the second image is four times size of the images, an internal position may be identified.

Accordingly, the plurality of feature kernels includes a respective feature kernel that may have been trained at a respective one of these nine positions. Hence, the image processing entity 400 selects the respective feature kernel that is associated with, i.e. trained for, the position. The position is thus a current position at which the particular feature kernel to be selected shall be applied.

Action A040

Next, in order to analyse an entirety of the feature map 302—that is the whole feature map 302—, the image processing entity 400 repeatedly applies the feature kernel, i.e. the selected feature kernel when applicable, to the feature map 302 in a stepwise manner.

As mentioned, the feature kernel was trained to identify the feature based on the feature maps 211 of the first feature map size FMS1. The feature kernel has the first feature map size. The feature maps 211 were obtained by convolving the convolutional kernel 202-206 over images 201 having the first image size IS1, which causes, at least due to the convolution, the feature map 302 to have the second feature map size FMS2.

The stepwise manner is represented by a step size that is greater than half of the first feature map size FMS1. At least two consecutive applications of the feature kernel may be applied such that the step size is less than or equal to the first feature map size FMS1. It may be preferred that there is no, or little, overlap between consecutive applications of the feature kernel. Therefore, the step size is often set to be equal to the first feature map size FMS1. With the step size as specified herein, major computational gain may be obtained as compared to the "overfeat-article" mentioned in the background section, since much fewer calculation are needed in order to cover the entire feature map 302.

As used herein, the term "step" may refer to displacement of consecutive applications of the feature kernel to the feature map, being too large for the feature kernel to analyse in "one step", i.e. the feature map is greater than the feature kernel.

As an example, the feature kernel 212 may be applied three times to feature map 302, e.g. at different positions of the feature map 302, in order to analyse the entirety of the feature map 302. This will thus result in three values, or scores, indicating probability of identification of the feature for which the feature kernel was trained to identify. There may be no or little overlap between applications of the feature kernel, i.e. due to that the step size is approximately equal to the first feature map size. Then, it may be that the three different scores provide some information about where in the image 301 the feature may have been identified. If a first value of the three values is 0.9, a second value of the three values is 0.2, and a third value of the three values is 0.1, then it may—depending on the order the values are organized—be that the feature is identified in e.g. a top left corner of the image 301.

It may also, or alternatively, be possible to consolidate each score, originating from respective applications of the feature kernel, or even respective feature kernels, into a common score for each feature to be identified. As an example, the common score may be calculated as a mean value of the scores for identification of the feature, a maximum value from among the scores for identification etc. In view of the preceding example, it may be that the maximum value of 0.9 may be selected as the common score.

In order to detect features that are larger than the feature kernel size FKS, i.e. the first feature map size FMS1, the method above may be re-run on a downscaled image version of the image 301, or several re-runs on several scales if needed.

As mentioned above, different positions of where within the final feature map the feature kernel is to be applied may decide which feature kernel among the plurality of feature kernels to be used. FIG. 6 illustrates nine different positions 1-9 with in an exemplifying feature map 600, such as the final feature map, onto which the selected feature kernel is to be applied. In this case, the second image size is four times the first image size in two directions. Thus, in total the second image size is 16 times the first image size.

A first corner position 1 may be located at an upper left corner of the feature map 600. A second corner position 3 may be located at an upper right corner of the feature map 600. A third corner position 6 may be located at a lower left corner of the feature map 600. A fourth corner position 8 may be located at a lower right corner of the feature map 600.

In this example, there are two upper edge positions 2, two left edge positions 4, two right edge positions 5 and two lower edge positions 7. The two upper edge positions 2 are associated with one feature kernel. Similarly, the two left edge positions 4, the two right edge positions 5 and the two lower edge positions 7 are associated with one respective feature kernel.

Furthermore, in this example, there are four internal positions 9, which also are associated with one respective feature kernel. This means that all of the internal positions 9 are treated in the same manner, e.g. by applying the same feature kernel to all of the internal positions. Likewise, the two upper edge positions 2 are treated in the same manner and so on for the left edge positions 4, the right edge positions 5 and the lower edge positions 7.

With reference to the pooling mentioned above, it may be noted that a scheme similar to what has been described above may also be used in case pooling is applied in the exemplifying convolutional neural network 300 of FIG. 3 or similar convolutional neural network.

Figure 7:
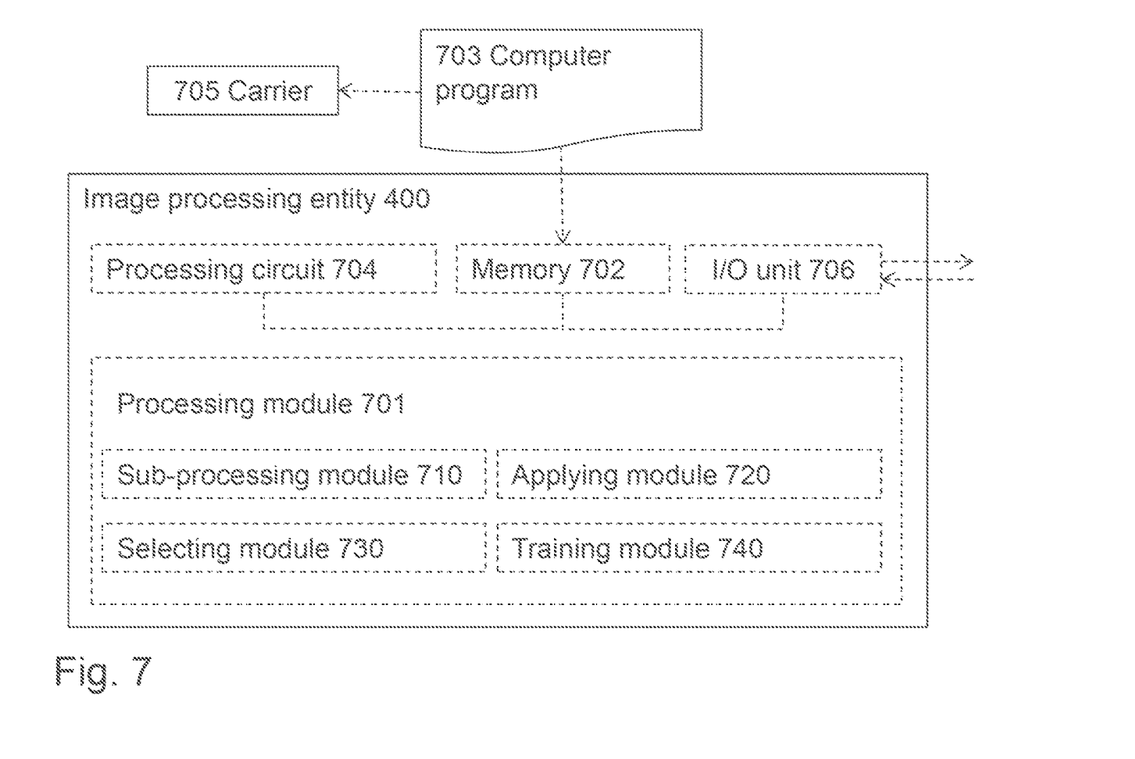
FIG. 7 is a more detailed block diagram illustrating embodiments of the image processing entity.

With reference to FIG. 7, a schematic block diagram of embodiments of the image processing entity 400 of FIG. 4 is shown. In this Figure, modules and the like that appear in some embodiments are indicated by dashed lines.

The method according to any one of the preceding claims, wherein the method is performed by the image processing entity 400.

The image processing entity 400 may comprise a processing module 701, such as a means for performing the methods described herein. The means may be embodied in the form of one or more hardware modules and/or one or more software modules The image processing entity 400 may further comprise a memory 702. The memory may comprise, such as contain or store, instructions, e.g. in the form of a computer program 703, which may comprise computer readable code units.

According to some embodiments herein, the image processing entity 400 and/or the processing module 701 comprises a processing circuit 704 as an exemplifying hardware module, which may comprise one or more processors. Accordingly, the processing module 701 may be embodied in the form of, or 'realized by', the processing circuit 704. The instructions may be executable by the processing circuit 704, whereby the image processing entity 400 is operative to perform the methods of FIG. 5. As another example, the instructions, when executed by the image processing entity 400 and/or the processing circuit 704, may cause the image processing entity 400 to perform the method according to FIG. 5.

In view of the above, in one example, there is provided an image processing entity 400 for applying a convolutional neural network to an image. As mentioned, the convolutional neural network comprises a convolutional kernel for convolving with images of a first image size to render feature maps and a feature kernel trained to identify a feature in the images based on the feature maps, wherein the first image size is less than a second image size of the image to which the convolutional network is applied. Again, the memory 702 contains the instructions executable by said processing circuit 704 whereby the image processing entity 400 is operative for:

processing the image while using the convolutional kernel to render a feature map, whereby a second feature map size of the feature map is greater than a first feature map size of the feature maps with which the feature kernel was trained, and repeatedly applying the feature kernel to the feature map in a stepwise manner, wherein the feature kernel was trained to identify the feature based on the feature maps of the first feature map size, wherein the feature kernel has the first feature map size, wherein the feature maps were obtained by convolving the convolutional kernel over images having the first image size, which causes, at least due to the convolution, the feature map to have the second feature map size, wherein the stepwise manner is represented by a step size that is greater than half of the first feature map size.

FIG. 7 further illustrates a carrier 705, or program carrier, which comprises the computer program 703 as described directly above. The carrier 705 may be one of an electronic signal, an optical signal, a radio signal and a computer readable medium.

In some embodiments, the image processing entity 400 and/or the processing module 701 may comprise one or more of a sub-processing module 710, an applying module 720, a selecting module 730 and a training module 740 as exemplifying hardware modules. In other examples, one or more of the aforementioned exemplifying hardware modules may be implemented as one or more software modules.

Moreover, the processing module 701 comprises an Input/Output unit 706.

Accordingly, the image processing entity 400 is configured for applying a convolutional neural network to an image.

Therefore, according to the various embodiments described above, the image processing entity 400 and/or the processing module 701 and/or the sub-processing module 710 is configured for processing the image while using the convolutional kernel to render a feature map, whereby a second feature map size of the feature map is greater than a first feature map size of the feature maps with which the feature kernel was trained.

The image processing entity 400 and/or the processing module 701 and/or the applying module 720 may be configured for repeatedly applying the feature kernel to the feature map in a stepwise manner, wherein the feature kernel was trained to identify the feature based on the feature maps of the first feature map size, wherein the feature kernel has the first feature map size, wherein the feature maps were obtained by convolving the convolutional kernel over images having the first image size, which causes, at least due to the convolution, the feature map to have the second feature map size, wherein the stepwise manner is represented by a step size that is greater than half of the first feature map size.

The image processing entity 400 and/or the processing module 701 and/or the selecting module 730 may be configured for selecting the feature kernel among a plurality of feature kernels based on a position of the feature kernel relatively the feature map.

The image processing entity 400 and/or the processing module 701 and/or the training module 740 may be configured for training the exemplifying conical convolutional neural network 200 of FIG. 2 with images of the first image size IS1.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method for applying a convolutional neural network to an image, wherein the convolutional neural network comprises a convolutional kernel for convolving with images of a first image size to render feature maps and a feature kernel trained to identify a feature in the images based on the feature maps, wherein the first image size is less than a second image size of the image to which the convolutional neural network is applied, wherein the method comprises:

processing the image while using the convolutional kernel to render a feature map, whereby a second feature map size of the feature map is greater than a first feature map size of the feature maps with which the feature kernel was trained, selecting the feature kernel among a plurality of feature kernels based on a position of the feature kernel relatively the feature map, which feature kernel is trained for said position, wherein the plurality of feature kernels includes a respective feature kernel that have been trained at a respective one of nine positions within the feature map, and repeatedly applying the feature kernel to the feature map in a stepwise manner, referring to displacement of consecutive applications of the feature kernel to the feature map, wherein the feature kernel was trained to identify the feature based on the feature maps of the first feature map size, wherein the feature kernel has the first feature map size, wherein the feature maps were obtained by convolving the convolutional kernel over images having the first image size, which causes, at least due to the convolution, the feature map to have the second feature map size, wherein the stepwise manner is represented by a step size that is greater than half of the first feature map size.

2. The method according to claim 1, wherein the position is one of four different corner positions, four different edge positions and an internal position.

3. The method according to claim 1, wherein at least two consecutive applications of the feature kernel are applied such that the step size is less than of equal to the first feature map size.

4. The method according to claim 1, wherein the method is performed by an image processing entity.

5. An image processing entity configured for performing the method according to claim 1.

6. A non-transitory computer storage medium that has computer readable code units stored therein that when executed on an image processing circuitry causes the image processing circuitry to perform the method according to claim 1.

* * * * *